United States Patent
Gooden et al.

(10) Patent No.: US 9,234,583 B2
(45) Date of Patent: Jan. 12, 2016

(54) HYDRAULIC SUPPLY SYSTEM FOR TORQUE CONVERTER IMPELLER CLUTCH

(75) Inventors: James T. Gooden, Canton, MI (US); Jacob M. Povirk, Franklin, MI (US); William R. Simpson, Saline, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 2587 days.

(21) Appl. No.: 11/879,434

(22) Filed: Jul. 17, 2007

(65) Prior Publication Data

US 2009/0020384 A1 Jan. 22, 2009

(51) Int. Cl.
*F16H 61/62* (2006.01)
*F16H 45/00* (2006.01)
*F16H 45/02* (2006.01)

(52) U.S. Cl.
CPC .......... *F16H 61/62* (2013.01); *F16H 2045/002* (2013.01); *F16H 2045/021* (2013.01); *F16H 2045/0252* (2013.01); *F16H 2045/0257* (2013.01); *F16H 2045/0284* (2013.01)

(58) Field of Classification Search
None
See application file for complete search history.

(56) References Cited

U.S. PATENT DOCUMENTS

| | | | |
|---|---|---|---|
| 2,642,168 A | 6/1953 | Black et al. | |
| 2,750,018 A | 6/1956 | Dundore | |
| 3,384,209 A | 5/1968 | Murphy | |
| 3,948,367 A | 4/1976 | Weinrich et al. | |
| 4,004,417 A | 1/1977 | Woody et al. | |
| 4,062,431 A | 12/1977 | Jameson | |
| 4,246,997 A | 1/1981 | Tarumizu | |
| 5,174,422 A * | 12/1992 | Murakami | 192/3.27 |
| 5,339,935 A * | 8/1994 | Ishii et al. | 192/3.3 |
| 5,549,184 A * | 8/1996 | Loffler et al. | 192/3.3 |
| 5,605,210 A * | 2/1997 | Koike et al. | 192/3.29 |
| 5,613,581 A | 3/1997 | Fonkalsrud | |
| 5,699,887 A | 12/1997 | Kundermann | |
| 5,802,490 A * | 9/1998 | Droste | 701/51 |
| 5,937,978 A * | 8/1999 | Fukushima | 192/3.29 |
| 6,419,059 B1 * | 7/2002 | Nobu et al. | 192/3.3 |
| 6,494,303 B1 | 12/2002 | Reik et al. | |
| 7,017,722 B2 * | 3/2006 | Leber | 192/3.27 |
| 7,044,279 B2 | 5/2006 | Leber | |
| 7,677,373 B2 * | 3/2010 | Bedert et al. | 192/3.29 |
| 2004/0188209 A1 | 9/2004 | Leber | |
| 2007/0289829 A1 * | 12/2007 | Matsuda et al. | 192/3.3 |
| 2008/0149441 A1 * | 6/2008 | Sturgin | 192/3.25 |
| 2008/0227597 A1 | 9/2008 | Povirk et al. | |

FOREIGN PATENT DOCUMENTS

JP 59205063 A 11/1984

* cited by examiner

*Primary Examiner* — Robert Hodge
*Assistant Examiner* — Ryan Dodd
(74) *Attorney, Agent, or Firm* — James Dottavio; MacMillan, Sobanski & Todd, LLC

(57) ABSTRACT

A hydraulic system for supplying fluid to a torque converter of an automatic transmission for a vehicle driven by a power source includes a torque converter including an impeller, a turbine, and an impeller clutch for alternately engaging and disengaging a drive connection between the impeller and the power source, a hydraulic control system producing line pressure and converter charge pressure that communicates with the impeller clutch, a discharge line communicating with the impeller clutch and through which hydraulic fluid discharges from the torque converter at a discharge pressure similar to the first pressure, thereby minimizing a pressure differential across the impeller clutch tending to disengage the impeller clutch, and an oil cooler to which fluid is supplied from at least one of the source of line pressure and the converter discharge line and from which fluid returns to the control system.

16 Claims, 5 Drawing Sheets

HYDRAULIC SUPPLY SYSTEM FOR TORQUE CONVERTER IMPELLER CLUTCH

BACKGROUND OF THE INVENTION

1. Field of the Invention

This invention relates generally to a torque converter for an automatic transmission, and, in particular, to a hydraulic system that actuates an impeller clutch of the torque converter and provides a continuous supply of hydraulic lubricant to transmission components.

2. Description of the Prior Art

A torque converter is a modified form of a hydrodynamic fluid coupling, and like a fluid coupling, is used to transfer rotating power from a prime mover, such as an internal combustion engine or electric motor, to a rotating driven load. A torque converter is able to multiply torque when there is a substantial difference between input and output rotational speed, thus providing the equivalent of a reduction gear.

In a torque converter there are at least three rotating elements: an impeller, which is mechanically driven by the prime mover; a turbine, which drives the load; and a stator, which is interposed between the impeller and turbine so that it can alter oil flow returning from the turbine to the impeller to multiply torque. The stator is mounted on an overrunning clutch, which prevents the stator from counter-rotating the prime mover but allows for forward rotation. The torque converter is encased in a housing, which contains with automatic transmission fluid (ATF), sometimes referred to as "oil," "lube" or "lubricant."

Hydrodynamic parasitic losses within the torque converter reduce efficiency and generate waste heat. In modern automotive applications, this problem is commonly avoided by use of a bypass clutch (also called lock-up clutch), which physically links the impeller and turbine, effectively changing the converter into a purely mechanical coupling. The result is no slippage, and therefore virtually no power loss and improved fuel economy.

Torque converter clutch designs include two basic types, a closed piston design and an open piston design. A closed piston design requires a dedicated hydraulic circuit into the torque converter, which communicates only with the apply side of the clutch piston. When pressure is high, the clutch applies. When pressure is low, the clutch releases. A more uncommon form is to have this circuit on the release side where high pressure releases the clutch and low pressure applies the clutch.

An open piston design involves flowing ATF through the torque converter and across the piston, flowing from the apply side to the release side. The piston is applied by the pressure difference between the apply and release sides. This pressure differential can be controlled by either controlling apply and release pressure directly or by controlling flow rate with a designed pressure drop restriction across the piston. Normally, this same flow of ATF is used to cool the torque converter, so a relatively high flow rate is required in this hydraulic circuit. A barrier to achieving the intended flow rate is the limitation on converter charge pressure to prevent converter ballooning (axial distortion of the torque converter). This commonly results in a high gain clutch design where small pressure drop changes across the piston result in large changes in apply force, which makes clutch controllability a challenge.

Most torque converters only have one converter clutch, the bypass clutch which alternately connects and releases a drive connection between the impeller and turbine. A torque converter can also provide an impeller clutch to connect and release a drive connection between the impeller and a power source, such as an engine, electric motor, starter/generator or hydraulic motor. The intent of the impeller clutch is to reduce load on the power source during idle, which reduces fuel consumption. This functionality is commonly referred to as idle-disconnect or neutral idle.

When two clutches are present within a torque converter, usually one piston is an open piston design while the other is a closed piston design. Having two closed piston designs within a torque converter is not practical because this requires four hydraulic circuits to communicate with the torque converter—one for each clutch, and two more to flow across the converter for cooling. Having two as open piston clutches presents a complicated design problem for controlling the apply and release of the two clutches independently. This leads to the more practical approach of using a closed piston design for the bypass clutch and an open piston design for the impeller clutch.

In an open piston design, the impeller clutch is actuated by a pressure differential between a converter charge circuit and a converter discharge circuit. A relatively high flow rate is required to cool the converter when the impeller clutch is engaged. Low flow restrictions across the closed clutch to reduce the pressure drop and a high gain clutch to maintain capacity would be required to avoid an excessive charge pressure. To disengage the impeller clutch, the pressure drop must be reduced lower yet. Because there is no direct control over flow restrictions across the clutch, pressure drop can only be reduced by reducing flow rate through the converter. During vehicle launch, the ramp rate of pressure drop across the converter clutch can be varied to achieve a variable "k factor" across the clutch for better launch feel.

When the torque converter is multiplying torque, power loss occurs which significantly increases the temperature of ATF in the torque converter and must be cooled before returning to the transmission. Cooler return oil is usually routed into the transmission lubrication circuit to cool internal clutches, gear sets and bearings. The lubrication circuit is also used to fill or charge balance dams, which are intended to keep disengaged clutch pistons from drifting on when internal rotational speeds increase.

The converter clutch control and hydraulic layout described above reduces flow to the downstream lube circuit when in idle-disconnect mode. When in idle-disconnect mode, the balance dams will drain down and result in an error state during the upcoming drive-away unless a minimum lubrication circuit flow rate is maintained, which cannot easily be met and still have the low pressure drop needed to disengage the impeller clutch. This error state could cause unintended clutch application including an early gear shift, an unintended gear state, or a tie up in the gearbox.

There is a need in the industry to control an impeller clutch in a torque converter during idle-disconnect mode without introducing risk to the transmission lubrication system.

SUMMARY OF THE INVENTION

A hydraulic system for supplying fluid to a torque converter of an automatic transmission for a vehicle driven by a power source includes a torque converter including an impeller, a turbine, and an impeller clutch for alternately engaging and disengaging a drive connection between the impeller and the power source, a hydraulic control system producing line pressure and converter charge pressure that communicates with the impeller clutch, a discharge line communicating with the impeller clutch and through which hydraulic fluid discharges from the torque converter at a discharge pressure greater than the first pressure, thereby producing a pressure differential across the impeller clutch tending to disengage the impeller clutch, and an oil cooler to which fluid is supplied from at least one of the source of line pressure and the converter discharge line and from which fluid returns to the control system.

The system supplies fluid to the impeller clutch in a torque converter and provides ample flow of lube to the transmission in all operating conditions including neutral-idle.

The system also improves fuel economy in a vehicle equipped with an automatic transmission having a torque converter impeller clutch.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
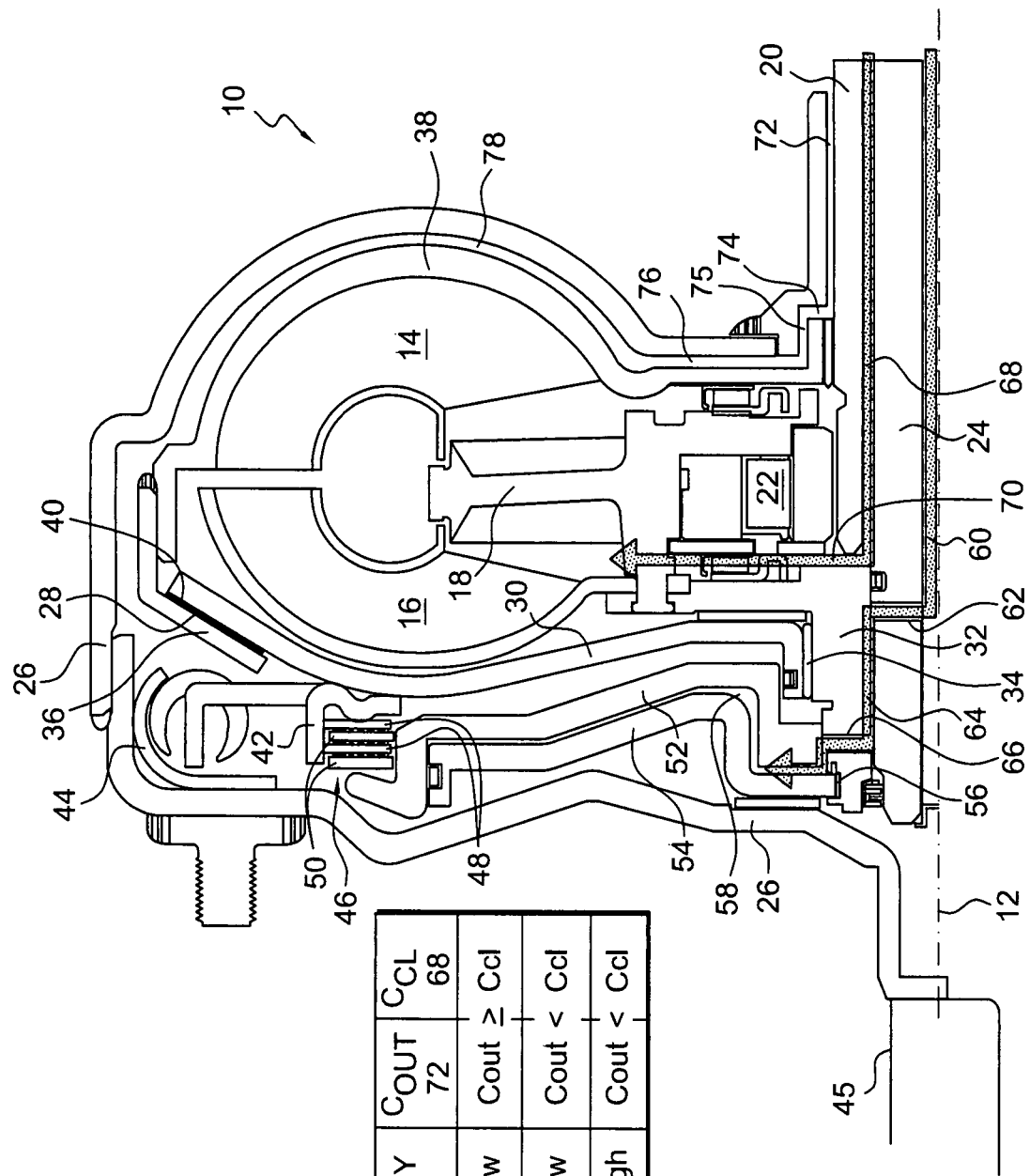
FIG. 1 is a cross section through a torque converter having a bypass clutch and impeller clutch.

Referring now to the drawings, there is illustrated in FIG. 1 a torque converter 10, which is arranged about a central axis 12 and includes an impeller 14, turbine 16, and stator 18. The impeller, stator and turbine define a toroidal fluid flow circuit, whereby the impeller is hydrokinetically connected to the turbine.

The stator 18 is secured to, and supported for rotation on a stationary stator sleeve shaft 20. An overrunning brake 22 anchors the stator to shaft 20 to prevent rotation of the stator in a direction opposite the direction of rotation of the impeller, although free-wheeling motion in the direction of rotation of the impeller is permitted. The turbine 16 is secured to a rotating transmission input shaft 24, which transmits torque to the transmission gear box (not shown). A torque converter housing 26, surrounding the turbine, impeller and stator, is driveably connected to the crankshaft of an internal combustion engine (not shown) or another power source, such as an electric motor.

Located within a torque converter housing 26 is an impeller clutch 28 for alternately opening and closing a drive connection between the impeller 14 and engine. Impeller clutch 28 includes a disc 30, supported for rotation on a turbine hub 32 by a bearing 34; a ring 36 secured to a shroud 38, which is attached to the periphery of each blade of the impeller 14; and friction plates 40, located between ring 36 and disc 30. A ring 42, secured to disc 30, is connected also to a torsion damper 44, which resiliently connects the engine shaft 45 through the cover 26 to disc 30. The engine shaft 45 is secured to cover 26.

Also located within the torque converter housing 26 is a lockup clutch 46 for alternately driveably connecting and releasing the turbine 16 and engine through cover 26. Clutch 46 includes a first set of friction discs 48, splined at their outer circumference to a surface of ring 42, and a second set of friction discs 50, each interleaved between consecutive first discs and secured to the turbine 16. Lockup clutch 46 is actuated by a piston 52, which is supported on turbine hub 32 and disc 30 allowing axial movement along axis 12 and will transfer torque to turbine hub 32 through a spline 56. A disc 54, secured by a spline 56 to turbine hub 32, is separated from piston 52 by a volume 58, which, when pressurized, moves piston 52 rightward forcing discs 50, 52 into mutual frictional contact and engaging clutch 46. When lockup clutch 46 is engaged, the engine shaft 45 and turbine 16 are mechanically interconnected and driveably connected to the transmission input shaft 24. When lockup clutch 46 is disengaged, the turbine 16 and engine shaft 45 are mechanically disconnected, and the turbine may be hydrokinetically driven by the impeller 14, provided impeller clutch 28 is fully engaged or slipping.

ATF that causes lockup clutch 46 alternately to engage or apply and to disengage or release is supplied from a converter apply pressure circuit of the hydraulic system, whose magnitude is varied and regulated by the hydraulic control and actuation system of the transmission. Converter apply pressure $C_{APY}$ is supplied from the converter apply pressure circuit of the hydraulic system to volume 58 through an fluid passage 60, passage 62 formed in input shaft 24, passage 64, and passage 66 formed in turbine hub 32.

A converter charge pressure hydraulic circuit of the hydraulic system includes passage 68, which communicates through radial fluid passage 70 to the toroidal volume of the torque converter 10. Converter charge pressure $C_{CL}$ supplied from the converter charge pressure circuit of the hydraulic system fills the torque converter 10 and develops a pressure force against the surface of impeller clutch disc 30 that is directed axially into impeller clutch 28 and ring 36.

A converter discharge hydraulic circuit of the hydraulic system includes passage 72 and communicates with passages 74, 75 and 76. Converter discharge pressure $C_{OUT}$ is controlled by the converter discharge pressure circuit of the hydraulic system fills a volume 78 between impeller shroud 38 and cover 26 and develops a pressure force against the left surface of disc 30 that opposes the force created by converter charge pressure. The engaged, disengaged and slipping state of impeller clutch 28 is determined by the magnitude of the pressure differential across disc 30, i.e., ($\Delta C_{CL}\ C_{OUT}$).

When the engine is idling and the transmission is in neutral gear, the pressure differential across disc 30, i.e. the difference between charge pressure and discharge pressure, must be low. When this differential pressure is low, impeller clutch 28 opens, thereby decoupling impeller 14 from the engine shaft 45 during the engine idle condition. Decoupling the impeller reduces load on the engine caused by the torque converter and reduces fuel consumption in drive, reverse and neutral operation.

Figure 2:
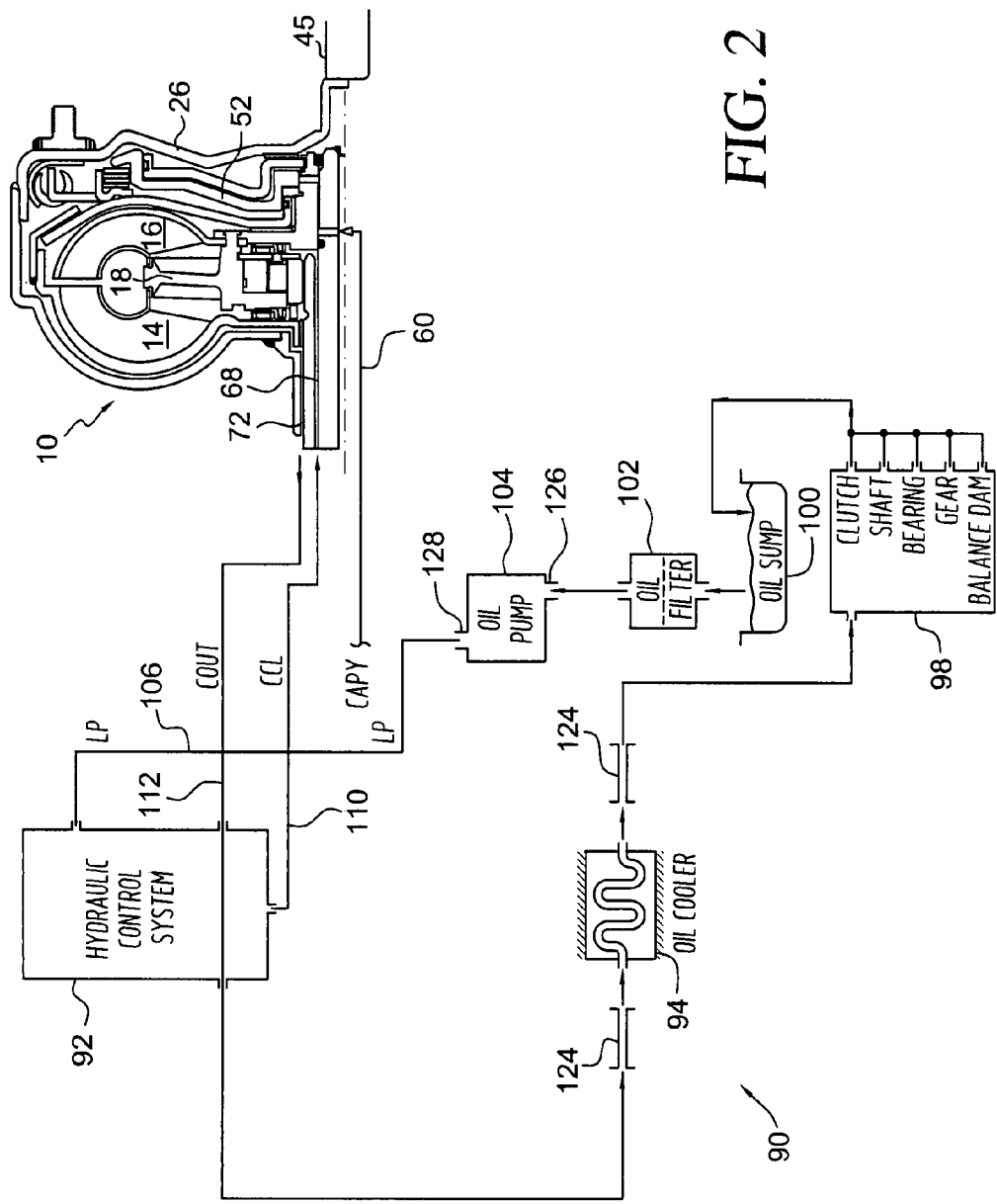
FIG. 2 is schematic diagram of a hydraulic system through which a torque converter having an impeller clutch is supplied with ATF while the impeller clutch is engaged.

FIG. 2 illustrates the ATF flow paths through a hydraulic system 90 when the impeller clutch 28 is engaged. The hydraulic system 90, which supplies ATF to the torque converter 10, includes a hydraulic control system 92, which provides a source of torque converter charge pressure and line pressure, includes an oil cooler 94; a lube circuit 98, which supplies ATO to clutches, shafts, bearings, and gears and balance dams in the transmission; an oil sump or reservoir 100; an oil filter 102; and an oil pump assembly 104, whose output provides to the hydraulic system 90 a source of line pressure 106, which is regulated by the hydraulic control 92.

Converter charge pressure CCL is carried in line 110 to converter charge passage 68. Flow at torque converter discharge pressure COUT is carried from converter passage 72 in discharge passage 112, which exits the transmission case 124, flows through oil cooler 94 located outside the case, reenters case 124, and supplies lubricant at low temperature to lube circuit 98. ATF exiting lube circuit 98 enters the oil sump 100, from which it enters the oil filter 102. The inlet 126 of oil pump 104 is supplied from filter 102, and the pump outlet 128 supplies oil at line pressure to the hydraulic control 92.

Figure 3:
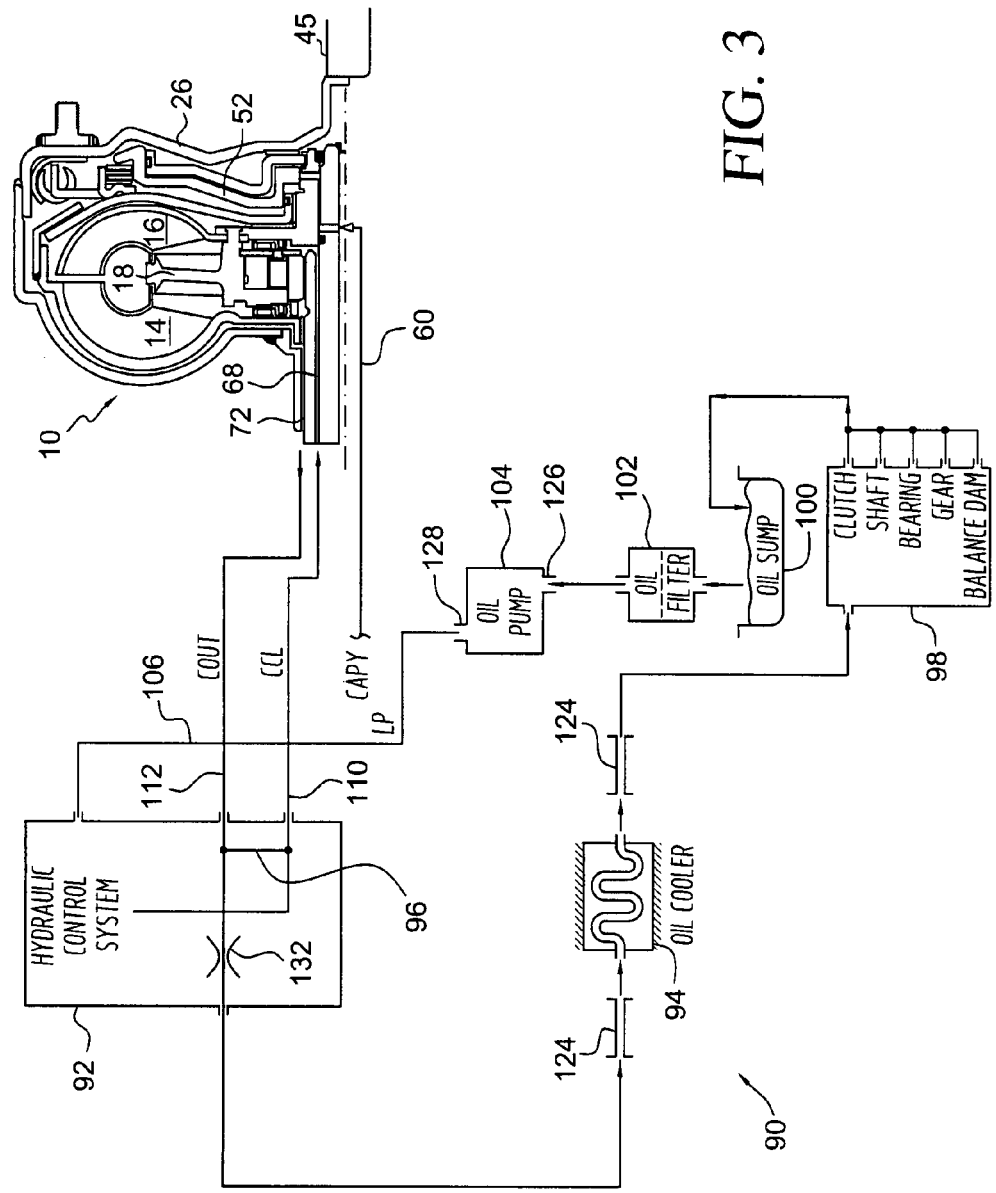
FIG. 3 is schematic diagram of a hydraulic system through which a torque converter having an impeller clutch is supplied with ATF while the impeller clutch is disengaged.

FIG. 3 illustrates a first embodiment in which the hydraulic system 90 causes the impeller clutch 28 to disengage. Converter charge pressure CCL is carried in line 110 to converter passage 68. Flow at torque converter discharge pressure COUT is carried from converter passage 72 in discharge passage 112 and through an orifice 132, which is sized to control flow rate to levels required by the cooling and lubrication circuits. The control system hydraulically connects converter charge pressure to converter discharge pressure 96 to reduce the pressure differential across the impeller clutch 28 sufficient to disengage the impeller clutch 28. Torque converter discharge exits transmission case 124, flows through oil cooler 94 located outside the case, reenters case 124, and supplies lubricant at low temperature to lube circuit 98. ATF exiting lube circuit 98 enters the oil sump 100, from which it enters the oil filter 102. The inlet 126 of oil pump 104 is supplied from filter 102, and the pump outlet 128 supplies oil at line pressure to the hydraulic control 92.

Figure 4:
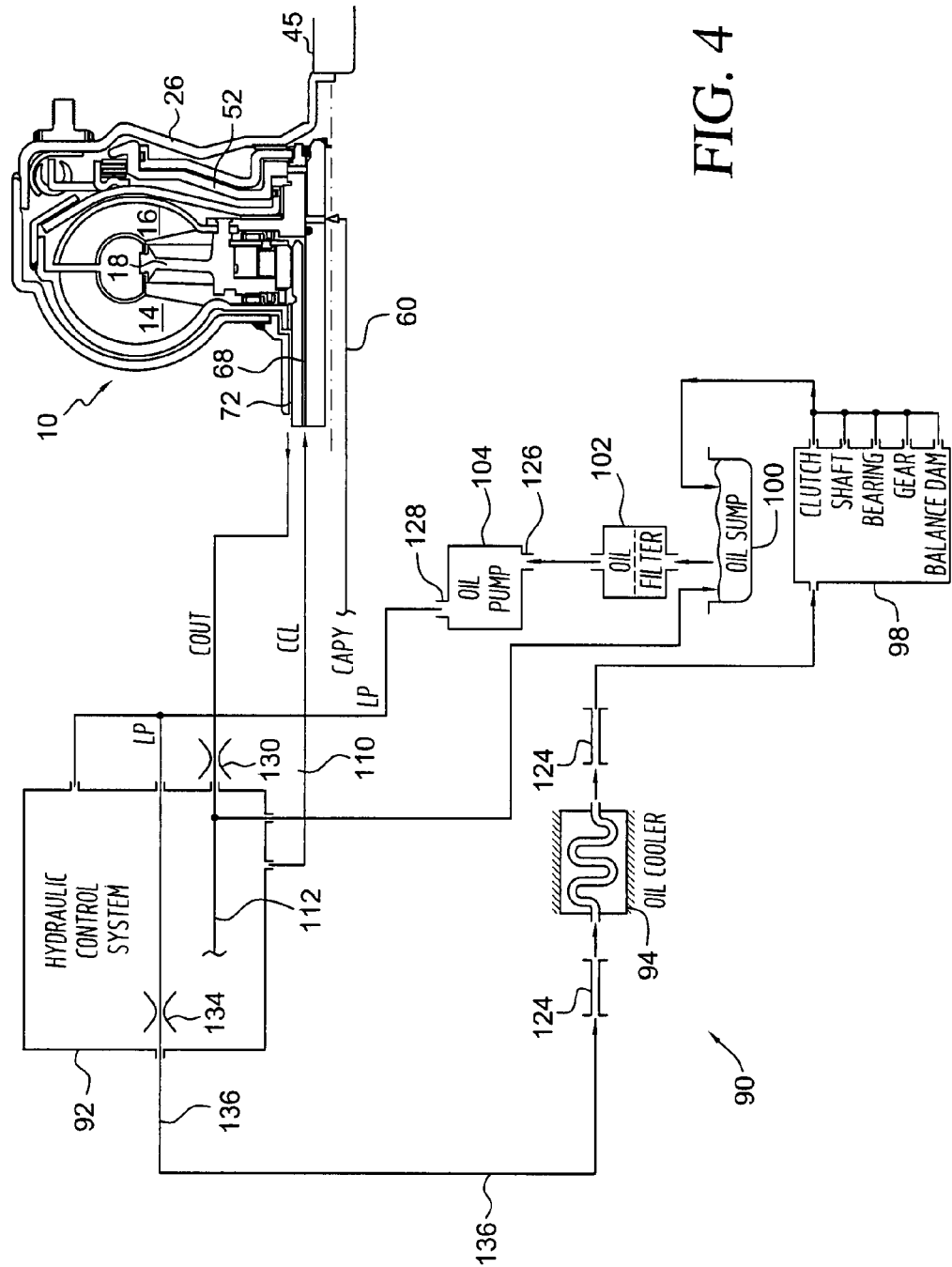
FIG. 4 is schematic diagram of an alternate embodiment of a hydraulic system for supplying ATF to the torque converter while the impeller clutch is disengaged.

FIG. 4 illustrates a second embodiment in which the hydraulic system 90 causes the impeller clutch 28 to disengage. Converter charge pressure CCL is carried in line 110 to converter passage 68. Flow at torque converter discharge pressure COUT is carried from converter passage 72 in discharge passage 112 and through an orifice 130, which is sized to reduce the flow rate sufficiently to reduce the pressure differential across the impeller clutch 28 sufficient to disengage the impeller clutch. Torque converter discharge flows directly to the oil sump 100, without exiting the case 124 or entering the oil cooler. Flow at line pressure regulated by hydraulic control system 92 is carried in line 136 through orifice 134, transmission case 124 and oil cooler 94 located outside the case, reenters case 124 and supplies lubricant at low temperature to lube circuit 98. ATF exiting lube circuit 98 enters the oil sump 100, from which it enters the oil filter 102. The inlet 126 of oil pump 104 is supplied from filter 102, and the pump outlet 128 supplies oil at line pressure to the hydraulic control system 92.

Figure 5:
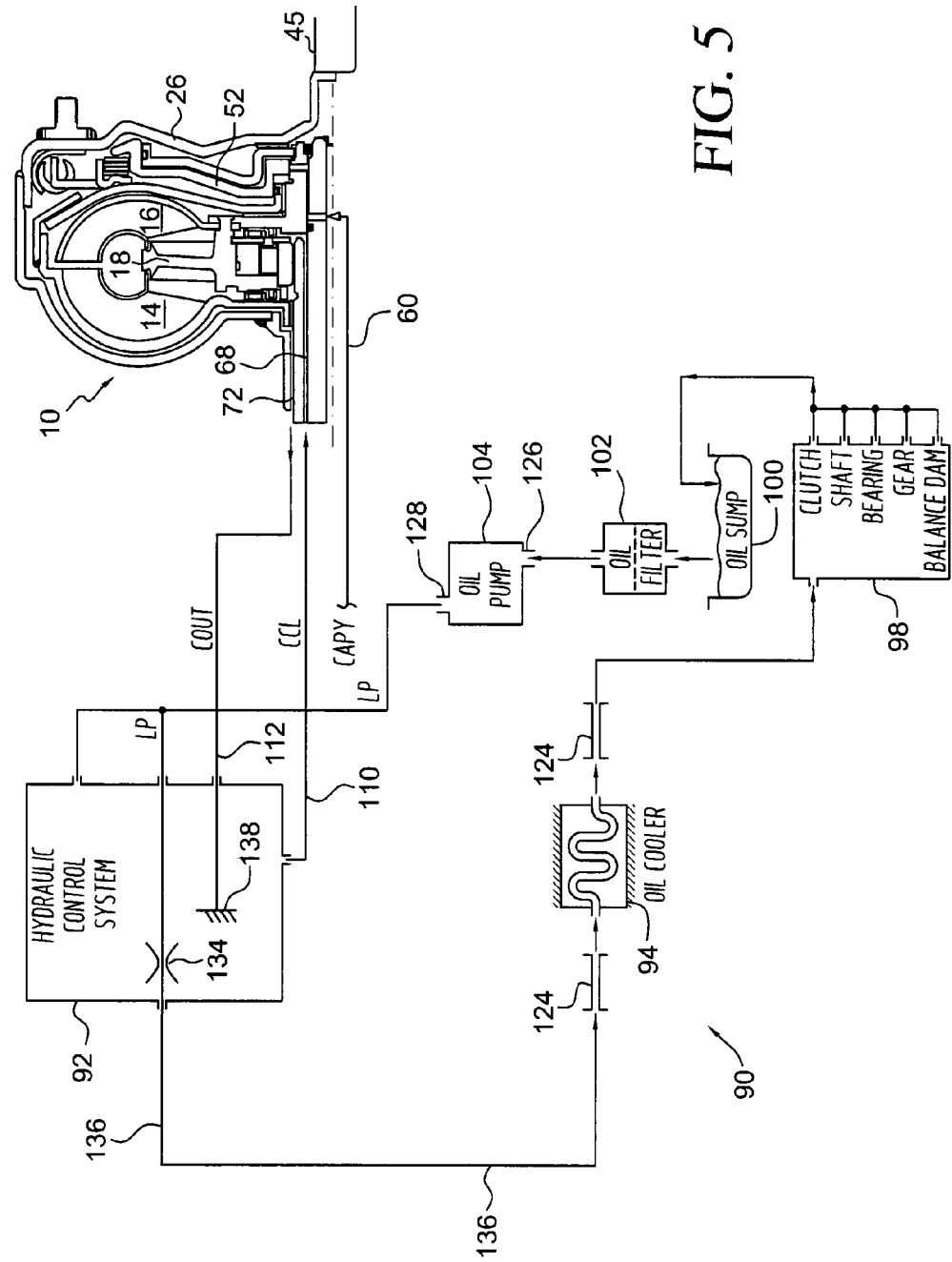
FIG. 5 is schematic diagram of another embodiment of a hydraulic system for supplying ATF to the torque converter while the impeller clutch is disengaged.

FIG. 5 illustrates a third embodiment in which the hydraulic system 90 causes the impeller clutch 28 to disengage the impeller clutch 28. Converter charge pressure CCL is carried in line 110 to converter passage 68. Flow at torque converter discharge pressure COUT is carried from converter passage 72 in discharge passage 112, where it is deadheaded at 138, permitting no flow to exit converter discharge passage 72 and producing a pressure in discharge passage 72 that is nearly the same as the pressure in converter charge pressure in line 110 and passage 68. Flow at line pressure regulated by hydraulic control system 92 is carried in line 136 through orifice 134, transmission case 124 and oil cooler 94 located outside the case, reenters case 124 and supplies lubricant at low temperature to lube circuit 98. ATF exiting lube circuit 98 enters the oil sump 100, from which it enters the oil filter 102. The inlet 126 of oil pump 104 is supplied from filter 102, and the pump outlet 128 supplies oil at line pressure to the hydraulic control system 92.

In accordance with the provisions of the patent statutes, the preferred embodiment has been described. However, it should be noted that the alternate embodiments can be practiced otherwise than as specifically illustrated and described.

What is claimed is:

1. A system for controlling a torque converter, comprising:
an impeller clutch;
a circuit carrying fluid through a cooler and a lube circuit;
a control system using fluid supplied to the control system from the circuit to produce charge pressure, and changing a differential between charge pressure and a discharge pressure across the impeller clutch by changing fluid flow in a discharge line carrying fluid from the impeller clutch to the control system.

2. The system of claim 1 further comprising:
a charge line in which fluid at charge pressure is supplied to the torque converter;
wherein the discharge line carries fluid at discharge pressure from the torque converter and the control system produces a connection between the charge line and the discharge line.

3. The system of claim 1
wherein the discharge line carries fluid at discharge pressure from the torque converter, and a flow rate of fluid in the discharge line to the circuit is controlled by flow through a flow restriction.

4. The system of claim 1, wherein:
fluid exiting an outlet of a pump in the circuit comprises a source of line pressure;
the discharge line carries fluid at discharge pressure from the torque converter;
the cooler includes an inlet connected to one of the source of line pressure and the discharge line; and
the lube circuit receives fluid from a discharge of the cooler.

5. The system of claim 4 further comprising:
an oil sump for receiving fluid from the lube circuit;
an oil filter for receiving fluid from the oil sump; and
an oil pump supplied with fluid from the oil filter for supplying fluid to the control system.

6. A system for controlling a torque converter, comprising:
an impeller clutch;
a circuit carrying fluid through a cooler and a lube circuit;
a control system using fluid supplied to the control system from the circuit to produce charge pressure, and changing a differential between charge pressure and discharge pressure across the impeller clutch by connecting a discharge line carrying fluid from the impeller clutch to a charge line carrying fluid to the impeller clutch.

7. The system of claim 6 further comprising:
the discharge line carries fluid at discharge pressure from the torque converter;
an orifice located in the discharge line; and
an oil sump hydraulically connected to the discharge line downstream from the orifice.

8. The system of claim 6 further comprising:
fluid exiting an outlet of a pump in the circuit comprises a source of line pressure;
the discharge line carries fluid at discharge pressure from the torque converter;
the cooler includes an inlet connected to one of the source of line pressure and the discharge line; and the lube circuit receives fluid from a discharge of the cooler.

9. The system of claim 8 further comprising:
an oil sump for receiving fluid from the lube circuit;
an oil filter for receiving fluid from the oil sump; and
an oil pump supplied with fluid from the oil filter for supplying fluid to the hydraulic control system.

10. The system of claim 8 further comprising:
an oil sump for receiving fluid from the lube circuit and the discharge line;
an oil filter for receiving fluid from the oil sump; and
an oil pump supplied with fluid from the oil filter for supplying fluid to the control system.

11. A system for supplying fluid to a torque converter, comprising:
an impeller clutch;
a circuit carrying fluid through a cooler and a lube circuit;
a control system producing charge pressure using fluid supplied to the control system from the circuit, and changing a differential between charge pressure and discharge pressure across the impeller clutch by one of restricting and stopping flow in a discharge line carrying fluid from the impeller clutch.

12. The system of claim 11
wherein the discharge line carries fluid at discharge pressure from the torque converter; and
the control system provides a flow restriction orifice located in the discharge line.

13. The system of claim 11
wherein the discharge line carries fluid at discharge pressure from the torque converter; and
the control system stops flow in the discharge line by deadheading the discharge line.

14. The system of claim 11:
fluid exiting an outlet of a pump in the circuit comprises a source of line pressure;
the cooler includes an inlet connected to one of the source of line pressure and the discharge line; and
the lube circuit receives fluid from a discharge of the oil cooler.

15. The system of claim 14 further comprising:
an oil sump for receiving fluid from the lube circuit;
an oil filter for receiving fluid from the oil sump; and
an oil pump supplied with fluid from the oil filter for supplying fluid to the control system.

16. The system of claim 1 further comprising:
a power source driveably connected to the torque converter;
wherein the control system prevents fluid flow in the discharge line by deadheading the discharge line while the power source is idling.

* * * * *